United States Patent
Tjader

(10) Patent No.: US 11,236,852 B2
(45) Date of Patent: *Feb. 1, 2022

(54) WINCH BOOM AND METHOD FOR TRENCHLESS REPLACEMENT

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,976

(22) Filed: Jan. 30, 2020

(65) Prior Publication Data

US 2020/0173597 A1 Jun. 4, 2020

Related U.S. Application Data

(63) Continuation of application No. 15/672,635, filed on Aug. 9, 2017, now Pat. No. 10,571,063, which is a continuation of application No. 14/994,573, filed on Jan. 13, 2016, now Pat. No. 9,739,409, which is a continuation of application No. 13/957,594, filed on Aug. 2, 2013, now Pat. No. 9,261,220.

(60) Provisional application No. 61/678,909, filed on Aug. 2, 2012.

(51) Int. Cl.
| | |
|---|---|
| *F16L 55/18* | (2006.01) |
| *F16L 1/032* | (2006.01) |
| *F16L 55/165* | (2006.01) |
| *F16L 1/028* | (2006.01) |

(52) U.S. Cl.
CPC .......... *F16L 55/1658* (2013.01); *F16L 1/028* (2013.01); *F16L 1/032* (2013.01); *F16L 55/18* (2013.01)

(58) Field of Classification Search
CPC . F16L 1/028; F16L 1/032; F16L 1/036; F16L 55/1657; F16L 55/1658; F16L 55/18
USPC ........................................................ 405/184.3
See application file for complete search history.

(56) References Cited

U.S. PATENT DOCUMENTS

| | | | | |
|---|---|---|---|---|
| 4,720,211 A | * | 1/1988 | Streatfield ............... | E21B 7/30 138/97 |
| 5,192,165 A | * | 3/1993 | Torielli ................... | E21B 7/30 138/111 |
| 5,211,509 A | * | 5/1993 | Roessler ................. | F16L 1/065 254/29 R |
| 5,544,977 A | * | 8/1996 | Gravy ..................... | E21B 7/30 166/55 |
| 5,626,442 A | * | 5/1997 | Boyer .................... | B08B 9/0436 134/22.1 |

(Continued)

FOREIGN PATENT DOCUMENTS

EP 1857402 A2 11/2007

OTHER PUBLICATIONS

"U.S. Appl. No. 15/672,635, Preliminary Amendment filed Oct. 17, 2017", 5 pgs.

(Continued)

*Primary Examiner* — Frederick L Lagman

(74) *Attorney, Agent, or Firm* — Schwegman Lundberg & Woessner, P.A.

(57) ABSTRACT

A pipe replacement system and method are shown. Configurations are shown that include a pulley that does not damage a bursting tool, as the bursting tool is pulled into a pit. Configurations are also shown that include a boom that does not need an extraction cage for the bursting tool.

13 Claims, 5 Drawing Sheets

(56) References Cited

U.S. PATENT DOCUMENTS

| | | | | |
|---|---|---|---|---|
| 6,443,657 | B1* | 9/2002 | Brahler | E21B 7/205 405/154.1 |
| 6,494,437 | B1* | 12/2002 | Boyer | B66D 5/08 254/323 |
| 7,048,257 | B2* | 5/2006 | Wentworth | B66D 1/741 212/296 |
| 8,083,213 | B2* | 12/2011 | Tjader | B66C 23/66 254/336 |
| 9,261,220 | B2* | 2/2016 | Tjader | F16L 55/1658 |
| 9,731,944 | B2 | 8/2017 | Tjader | |
| 9,739,409 | B2* | 8/2017 | Tjader | F16L 55/18 |
| 10,571,063 | B2* | 2/2020 | Tjader | F16L 55/18 |
| 2006/0056919 | A1* | 3/2006 | Tjader | F16L 55/1658 405/184.3 |
| 2007/0072716 | A1 | 3/2007 | Swane | |
| 2008/0090687 | A1 | 4/2008 | Eck | |
| 2013/0156505 | A1* | 6/2013 | Tjader | B66D 3/08 405/183.5 |
| 2014/0037386 | A1 | 2/2014 | Tjader | |
| 2016/0123516 | A1 | 5/2016 | Tjader | |
| 2018/0023746 | A1 | 1/2018 | Tjader | |

OTHER PUBLICATIONS

"U.S. Appl. No. 13/957,594, Final Office Action dated May 20, 2015", 5 pgs.

"U.S. Appl. No. 13/957,594, Non Final Office Action dated Jun. 19, 2014", 6 pgs.

"U.S. Appl. No. 13/957,594, Non Final Office Action dated Dec. 16, 2014", 7 pgs.

"U.S. Appl. No. 13/957,594, Notice of Allowance dated Oct. 5, 2015", 5 pgs.

"U.S. Appl. No. 13/957,594, Response filed Mar. 12, 2015 to Non Final Office Action dated Dec. 16, 2014", 6 pgs.

"U.S. Appl. No. 13/957,594, Response filed Sep. 17, 2014 to Non Final Office Action dated Jun. 19, 2014", 7 pgs.

"U.S. Appl. No. 13/957,594. Response filed Sep. 21, 2015 to Final Office Action dated May 20, 2015", 5 pgs.

"U.S. Appl. No. 14/994,573, Final Office Action dated Feb. 7, 2017", 6 pgs.

"U.S. Appl. No. 14/994,573, Non Final Office Action dated Jun. 16, 2016", 8 pgs.

"U.S. Appl. No. 14/994,573, Notice of Allowance dated Apr. 18, 2017", 5 pgs.

"U.S. Appl. No. 14/994,573, Response filed Nov. 14, 2016 to Non Final Office Action dated Jun. 16, 2016", 6 pgs.

"U.S. Appl. No. 14/994,573, Response filed Nov. 16, 2016 to Non-Final Office Action dated Jun. 16, 2016", 6 pgs.

"U.S. Appl. No. 14/994,573, Response filed Apr. 4, 2017 to Final Office Action dated Feb. 7, 2017", 4 pgs.

"U.S. Appl. No. 15/672,635, Advisory Action dated Jul. 31, 2019", 3 pgs.

"U.S. Appl. No. 15/672,635, Final Office Action dated Apr. 11, 2019", 7 pgs.

"U.S. Appl. No. 15/672,635, Non Final Office Action dated Feb. 23, 2018", 9 pgs.

"U.S. Appl. No. 15/672,635, Non Final Office Action dated Sep. 17, 2018", 6 pgs.

"U.S. Appl. No. 15/672,635, Notice of Allowance dated Oct. 17, 2019", 5 pgs.

"U.S. Appl. No. 15/672,635, Response filed Jun. 25, 2018 to Non Final Office Action dated Feb. 23, 2018", 10 pgs.

"U.S. Appl. No. 15/672,635, Response filed Jan. 16, 2019 to Non-Final Office Action dated Sep. 17, 2018", 8 pgs.

\* cited by examiner

WINCH BOOM AND METHOD FOR TRENCHLESS REPLACEMENT

CLAIM OF PRIORITY

This application is a Continuation of U.S. patent application Ser. No. 15/672,635, filed Aug. 9, 2017 (Issued as U.S. Pat. No. 10,571,063), which is a Continuation of U.S. patent application Ser. No. 14/994,573, filed Jan. 13, 2016 (Issued as U.S. Pat. No. 9,739,409), which is a Continuation of U.S. patent application Ser. No. 13/957,594, filed Aug. 2, 2013 (Issued as U.S. Pat. No. 9,261,220), which is a Non-Provisional of and claims the benefit of priority from U.S. Provisional Application Ser. No. 61/678,909, filed Aug. 2, 2012, which applications are hereby incorporated by reference herein in their entirety.

BACKGROUND

Trenchless pipe replacement is useful for replacement of pipes or other buried conduits without the need to excavate the length of pipe to be replaced. An example of trenchless pipe replacement includes pulling a cutting blade with an expander through the pipe to be replaced, and attaching a new pipe behind the cutting blade. The pipe to be replaced is split, and pushed into the surrounding soil, and the new pipe, of equal or larger diameter, is pulled into the new space within the split pipe. Splitters are commonly used for small diameter pipes, and for pipes of a material that lends itself to splitting. Another example of trenchless pipe replacement includes pipe bursting.

Gas lines are one example of pipes where splitting is useful in pipe replacement. An example includes high density polyethylene (HDPE) gas pipe. For example, large quantities of 2 inch diameter HDPE gas pipes are currently in need of replacement. 300 miles of gas pipe in a single city in need of replacement is not uncommon. Given the desirability of minimizing trenches, it is also desirable to minimize the size of entry and exit pits for operating trenchless equipment. Cutting pipes in small entry and exit pits can be a challenge due to the small amount of available space to operate cutting tooling.

DETAILED DESCRIPTION

Figure 1:
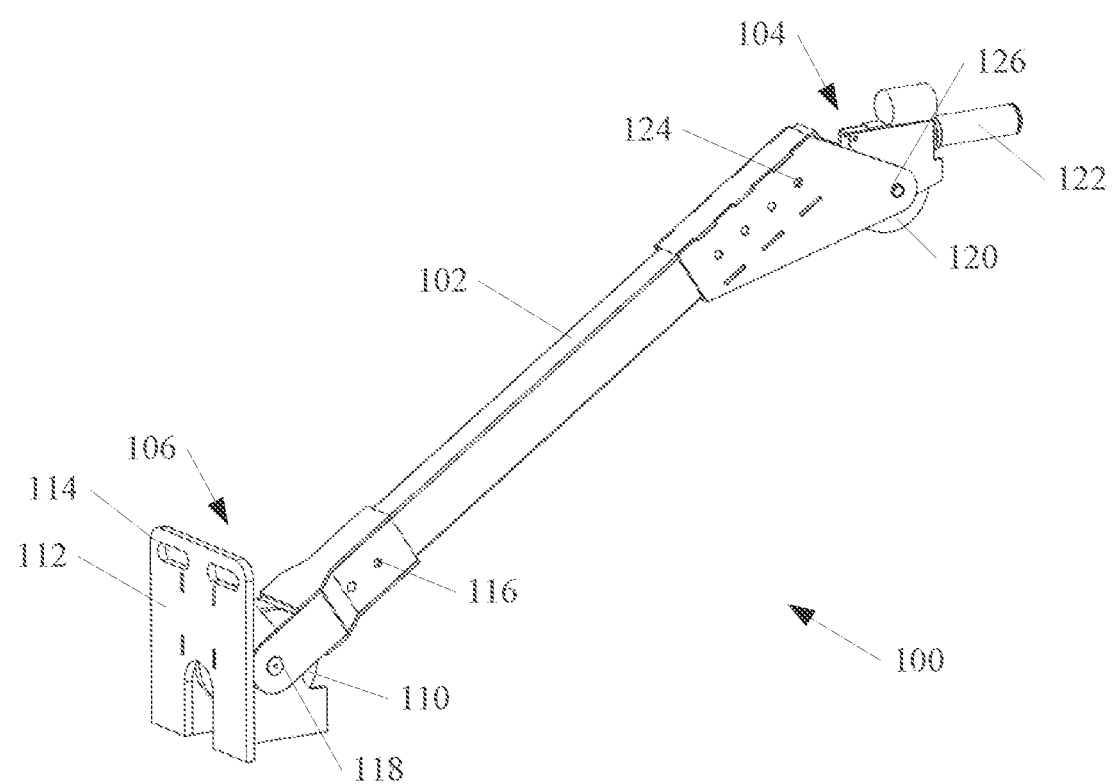
FIG. 1 shows an isometric view of a pipe replacement system according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and mechanical, structural, or logical changes, etc. may be made without departing from the scope of the present invention. The term "cable" in the following detailed description is used in a broad sense, and is intended to include any number of flexible lines such as wire rope, and other flexible materials that are sufficiently strong for pipe bursting operations.

FIG. 1 shows an example of a pipe replacement system 100. A boom 102 is shown, having a first end 104 to couple to a winch (not shown) and a second end 106 to deploy in a pit. A fitting 122 is shown coupled to the first end 104 for attachment to the winch. A reaction plate 112 is shown at the second end. In one example, the reaction plate 112 includes one or more handles 114. In one example, the pipe replacement system 100 is intended to be assembled by hand at a job site, and it is advantageous to include features such as handles 114 to facilitate assembly of components of the pipe replacement system 100 on site.

In one example, the boom 102 includes a first fastener 116 and a second fastener 124 to further facilitate assembly and disassembly of the pipe replacement system 100. In the example shown in FIG. 1, the first fastener 116 and second fastener 124 include pins that may be inserted in one of a plurality of holes to adjust a length of the boom 102.

A first pulley 120 is shown at the first end 104 of the boom 102. A second pulley 110 is shown at the second end 106 of the boom 102. In the example shown, the first pulley 120 rotates about a first pivot 126. In the example shown, in addition to providing a pivot axis for the first pulley 120, the boom 102 is allowed to rotate about the first pivot 126. Similarly, the second pulley 110 rotates about a second pivot 118. In the example shown, in addition to providing a pivot axis for the second pulley 110, the boom 102 and/or the reaction plate 112 is allowed to rotate about the second pivot 118. The ability for the boom 102 to pivot (for example to the approximately 45 degree angle shown in FIG. 1) provides advantages such as more available space for operations in the pit.

Figure 2:
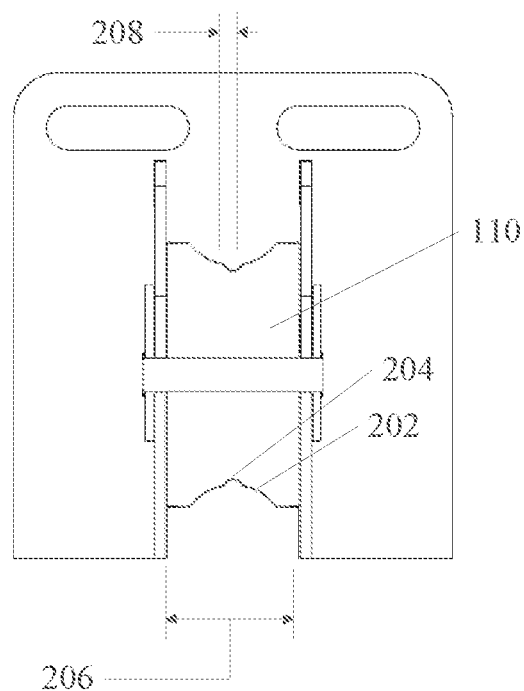
FIG. 2 shows a cross section of a portion of the pipe replacement system from FIG. 1, according to an embodiment of the invention.

FIG. 2 shows the second pulley 110 from FIG. 1. The second pulley 110 includes a bursting tool guide surface 202. In one example, the second pulley 110 further includes a cable groove 204 in a center of the pulley 110, and within the bursting tool guide surface 202. The bursting tool guide surface 202 is shown having a width 206 that is greater than a cable diameter. In one example the width 206 indicates a diameter that is sized to substantially match a bursting tool diameter as will be discussed in more detail below. FIG. 2 also illustrates a dimension 208 to indicate a width of the cable groove 204. In one example the dimension 208 is sized to substantially match a cable diameter.

In one example, the bursting tool guide surface 202 of the second pulley 110 includes a polymeric surface. In one example, the body of the second pulley 110 is substantially formed from a single polymeric casting, such as high density polyurethane. The polymeric surface may function to protect a bursting tool from damage during operation, as discussed in more detail below. In one example, the second pulley 110 may include a metallic body, with a polymeric coating. While polyurethane is used as an example polymeric surface, other polymeric materials are also within the scope of the invention. In one example, any material that reduces damage to a bursting tool over a metallic pulley may be used for the bursting tool guide surface 202.

Figure 3:
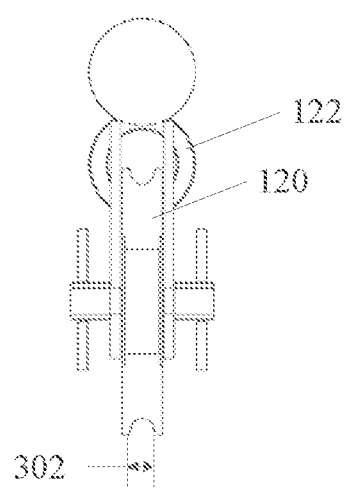
FIG. 3 shows another cross section of a portion of the pipe replacement system from FIG. 1, according to an embodiment of the invention.

FIG. 3 shows the first pulley 120 from FIG. 1. In the example shown, the first pulley 120 is only sized with a dimension 302 to substantially match the cable diameter.

Figure 4:
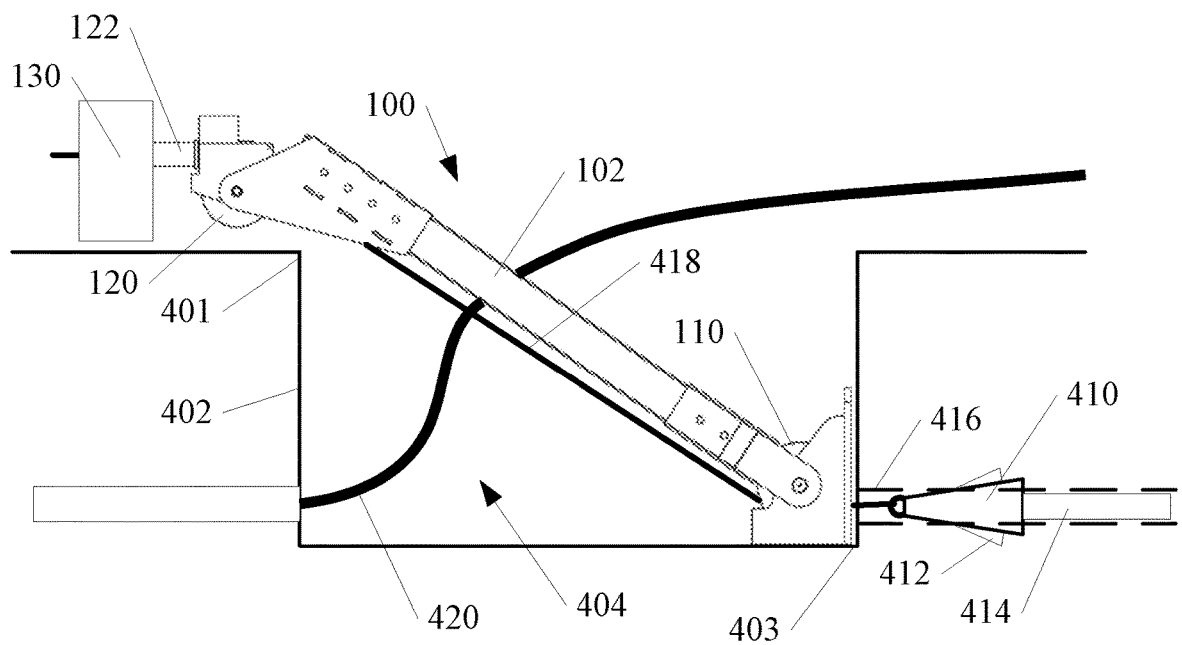
FIG. 4 shows a side view of a pipe replacement operation according to an embodiment of the invention.

FIG. 4 shows an example trenchless pipe replacement operation using the pipe replacement system 100 shown in FIGS. 1-3. The boom 102 is placed into a pit 402 at an angle from a winch corner 401 to an exit corner 403. By placing the boom 102 at an angle in the pit 402, additional space 404 behind the boom is not encumbered, and the space 404 may be more easily accessed and utilized for fittings such as connecting a bypass line 420. Such a configuration may be particularly useful in a natural gas line replacement operation. When using configurations of pipe replacement systems as shown in the present disclosure, an extraction cage or other extraction structures for removal of the bursting tool may also be eliminated as discussed below. By eliminating the need for an extraction cage, the space 404 behind the boom 102 may further be increased and/or a size of the pit 402 may be reduced. Reducing a size of the pit 402 is desirable to minimize necessary road repair on the surface after the pit 402 is filled in.

FIG. 4 shows a bursting tool 410 pulling in a new pipe 414 while bursting a pipe to be replaced 416. In the example shown, the bursting tool 410 includes a one or more splitting blades 412, although the invention is not so limited. In one example, the bursting tool 410 includes a simple conical expander. In one example the bursting tool includes a reciprocating hammer. The bursting tool 410 is being pulled in by a cable 418 connected to a winch (not shown) that would be located at fitting 122. In one example, the cable passes over the second pulley 110, along the boom 102, and over the first pulley 120. In one example the cable 418 runs within cable groove 204 of the second pulley.

Figure 5:
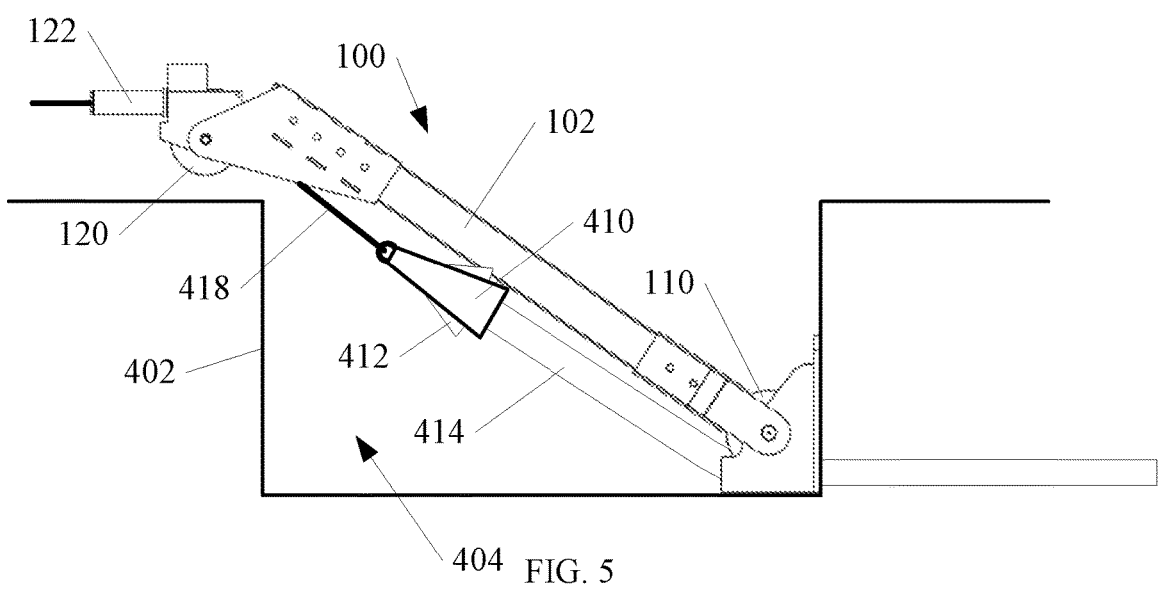
FIG. 5 shows another side view of a pipe replacement operation according to an embodiment of the invention.

FIG. 5 shows the example trenchless pipe replacement operation from FIG. 4 as the operation progresses. The bursting tool 410 has been pulled into the pit 402, and is travelling along a length of the boom 102. In one example, the bursting tool 410 travels over the second pulley 410 in contact with the bursting tool guide surface 202 shown in FIG. 2. The polymeric surface of the bursting tool guide surface 202 reduces or eliminates any damage to the bursting tool 410. In particular, in examples where the bursting tool 410 includes splitting blades 412, the polymeric surface of the second pulley 110 reduces or eliminates any damage to the splitting blades 412.

Because the bursting tool 410 has now been pulled into the space 404 behind the boom 102, the bursting tool 410 may now be easily removed from an extending portion of the new pipe 414. In addition, the extending portion of the new pipe 414 may now be more easily attached to a next section of new pipe in a subsequent replacement operation when continuing pipe replacement from the pit 402. As noted above, using example pipe replacement systems shown, no extraction cage is needed. The bursting tool 410 is pulled upwards at an angle along the boom 102, instead of straight into the pit into an extraction cage, as in existing technology. Because of the angle along the boom 102, the additional space 404 is untouched, and available for work on other fittings, or to reduce a size of the pit 402 needed.

In one example the space 404 is sufficient to allow a reciprocating hammer bursting tool to enter the pit 402. Reciprocating hammers tend to be long, relative to dimensions of a pit. In one example a winch pulling force may be reduced at an end of a pull, and the long reciprocating hammer may be pulled into the pit without damage to the reciprocating hammer. After the reciprocating hammer is within the pit, the reciprocating hammer is allowed to pivot upwards in line with the boom 102. Without the available space 404, this operation would not be possible. An extraction cage would get in the way of removal of any bursting tool as long as a reciprocating hammer.

Figure 6:
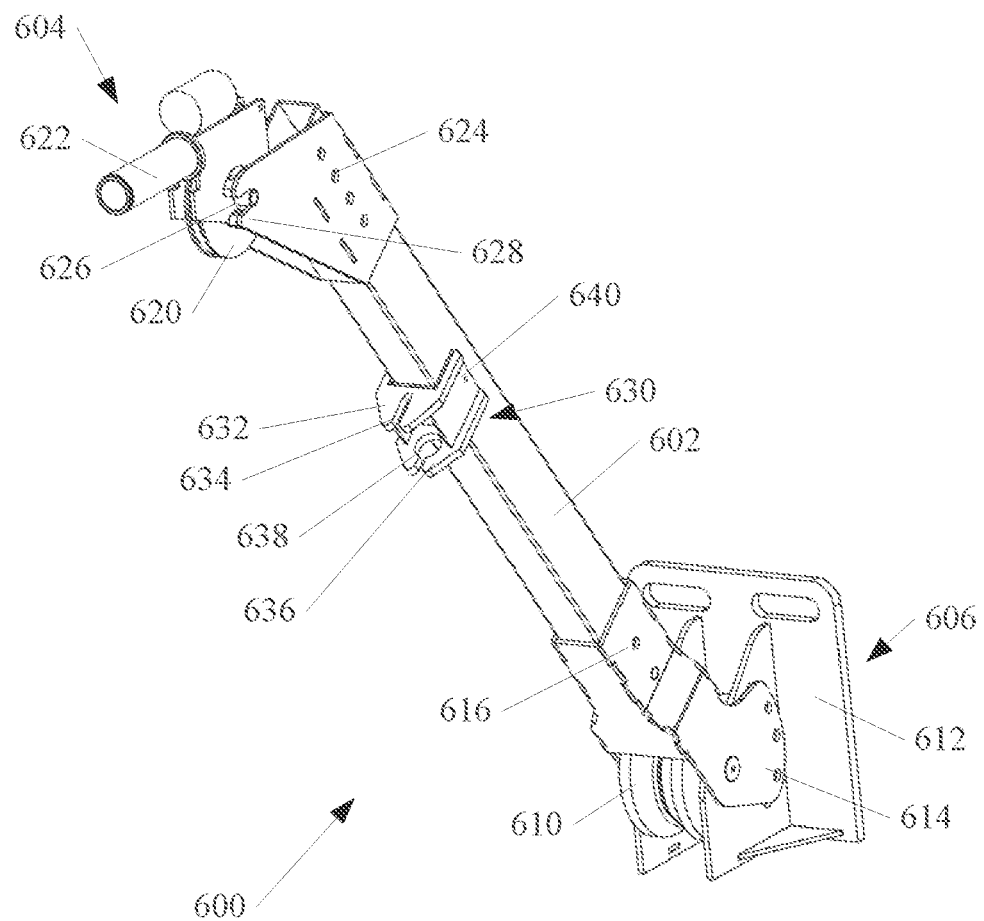
FIG. 6 shows an isometric view of a pipe replacement system according to an embodiment of the invention.

FIG. 6 shows another example of a pipe replacement system 600. A boom 602 is shown, having a first end 604 to couple to a winch (not shown) and a second end 206 to deploy in a pit. A fitting 622 is shown coupled to the first end 604 for attachment to the winch. A reaction plate 612 is shown at the second end. In one example, the boom 602 includes a first fastener 616 and a second fastener 624 to facilitate assembly and disassembly of the pipe replacement system 600. In the example shown in FIG. 6, the first fastener 616 and second fastener 624 include pins that may be inserted in one of a plurality of holes to adjust a length of the boom 602.

In the example system 600 of FIG. 6, a mechanism 614 is included to select and fix an angle between the reaction plate 612 and the boom 602. In the example shown, the mechanism 614 includes a pin and an array of holes. Other mechanisms for selecting and fixing an angle between the reaction plate 612 and the boom 602, such as slots and bolts, etc. are also within the scope of the invention.

A first pulley 620 is shown at the first end 604 of the boom 602. A second pulley 610 is shown at the second end 606 of the boom 602. In the example shown, the first pulley 620 rotates about a first pivot 626. In the example shown, in addition to providing a pivot axis for the first pulley 620, the boom 602 is allowed to rotate about the first pivot 626. In the example shown, the boom 602 is capable of disassembly from the system 600 using a fork 628 that engages and disengages from the first pivot 626. This configuration further allows for ease of assembly and disassembly of the system 600 on site.

In one example the second pulley 610 is similar to the second pulley 110 from previous examples. In one example, the second pulley 610 includes a bursting tool guide surface, and a cable groove in a center of the pulley 610. In one example, the second pulley 610 includes a width that is sized to substantially match a bursting tool diameter. In one example, the bursting tool guide surface of the second pulley 610 includes a polymeric surface. In one example, any material that reduces damage to a bursting tool over a metallic pulley may be used for the bursting tool guide surface.

The system 600 of FIG. 6 also includes a limiter 630. During some pipe replacement operations, as a bursting tool nears an end of a pull, and is about to exit into the pit, some amount of the pipe to be replaced may be pulled from the ground, and be held captive around the cable. This may be undesirable, as the pipe to be replaced may jam the system at or near the winch.

In the example shown in FIG. 6, the limiter 630 includes a passage 634 that allows a cable (not shown) to pass through, but the passage 634 is configured to be too narrow to allow an end of pipe to be replaced from passing through. If an end of the pipe to be replaced begins to pull out of the ground, it is stopped by the limiter 634 and is prevented from jamming the winch or the first pulley 620, etc.

In one example the passage 634 includes a forked slot to allow the cable to be inserted from a side. In one example the limiter 630 further includes a second passage 638 that will hold an end of the pipe to be replaced against the boom 602. In the event of a pipe to be replaced pulling out of the ground as described above, the second passage 638 will hold the end of the pipe to be replaced against the boom 602, and in contact with the first passage 634, thus ensuring that the pipe to be replaced does not pull over the passage 634 and continue up the boom 602 and cause a jam.

In one example the limiter 630 is selectably removable from the system 600. In one example operation, after a bursting tool enters the pit, the limiter 630 may be removed from the boom 602, allowing the bursting tool to enter the pit along the boom 602 as far as possible. This allows more room to cut the new pipe and to more easily remove the bursting tool for use in the next bursting operation.

Figure 7:
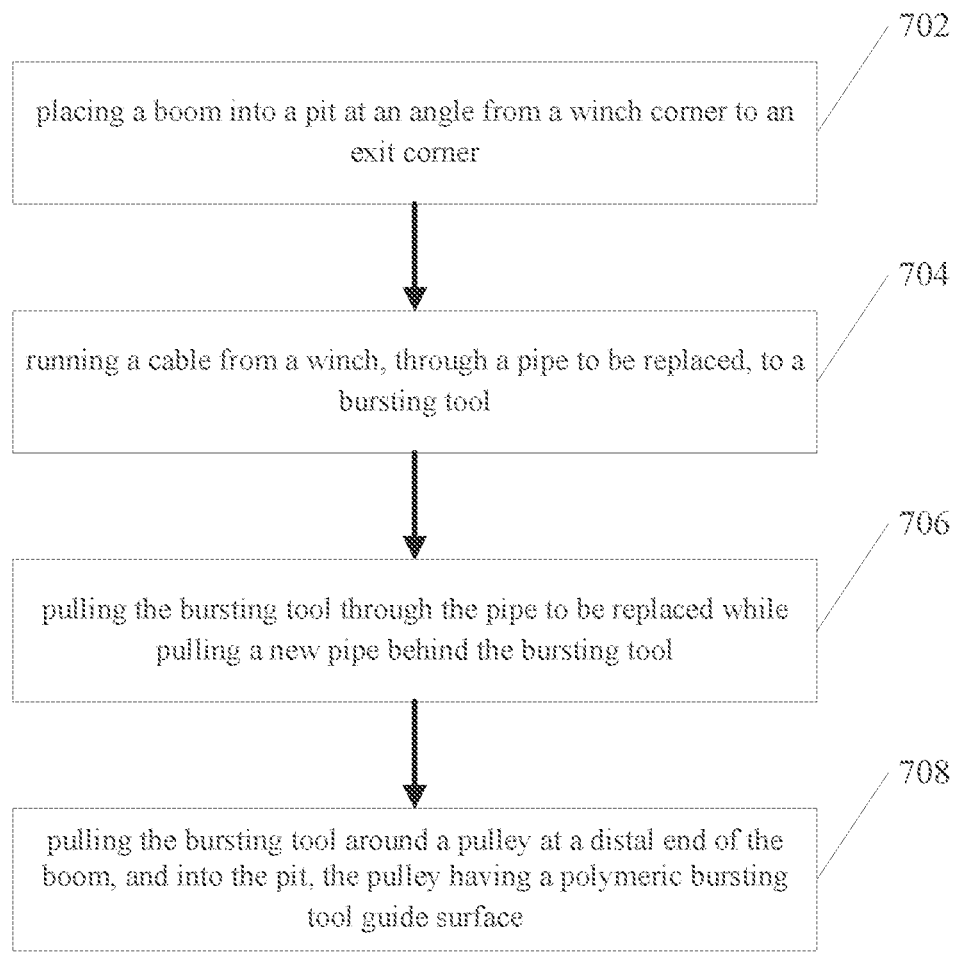
FIG. 7 shows a flow diagram of a method of pipe replacement according to an embodiment of the invention.

FIG. 7 shows a flow diagram of an example method of pipe replacement according to an embodiment of the invention. In operation 702, a boom is placed into a pit at an angle from a winch corner to an exit corner. In operation 704, a cable is run from a winch, through a pipe to be replaced, to a bursting tool. In operating 706, the bursting tool is pulled through the pipe to be replaced while pulling a new pipe behind the bursting tool, and in operation 708, the bursting tool is pulled around a pulley at a distal end of the boom, and into the pit, the pulley having a polymeric bursting tool guide surface.

While a number of advantages of embodiments of the invention are described, any lists of above mentioned advantages are not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and methods are used. The scope of the invention should be determined with reference to the appended claims, along with the full scope of equivalents to which such claims are entitled.

I claim:

1. A pipe replacement system, comprising:
   a boom, having a first end to couple to a winch, and a second end to deploy in a pit;
   at least one reaction plate pivotally coupled to the second end of the boom, and rotatable about a first pulley rotation axis, the first pulley coupled to the second end of the boom;
   wherein the first pulley includes a bursting tool guide surface having a diameter greater than a cable diameter, the diameter being sized to substantially match a bursting tool diameter; and
   a second pulley located at the first end of the boom.

2. The pipe replacement system of claim 1, wherein the first end of the boom includes a fork to removably couple the first end of the boom from the second pulley.

3. The pipe replacement system of claim 1, wherein the first pulley includes a cable groove in a center of the pulley, within the bursting tool guide surface.

4. The pipe replacement system of claim 1, wherein the first pulley is a single polymer casting.

5. The pipe replacement system of claim 1, wherein the first pulley includes a metallic pulley with a polymer coating.

6. The pipe replacement system of claim 1, wherein a boom length is adjustable.

7. A pipe replacement system, comprising:
   a boom, having a first end to couple to a winch, and a second end to deploy in a pit;
   at least one reaction plate pivotally coupled to the second end of the boom, and rotatable about the second end of the boom;
   a mechanism to select and fix an angle from more than two possible angles between the reaction plate and the boom;
   a first pulley coupled to the second end of the boom, wherein the first pulley includes a bursting tool guide surface having a diameter greater than a cable diameter, the diameter being sized to substantially match a bursting tool diameter; and
   a second pulley located at the first end of the boom.

8. The pipe replacement system of claim 7, further including a limiter located along a length of the boom, between the first end and the second end, the limiter being configured to stop a pipe to be replaced from jamming the winch.

9. The pipe replacement system of claim 8, wherein the limiter is removable from a side surface of the boom.

10. The pipe replacement system of claim 7, wherein a boom length is adjustable.

11. The pipe replacement system of claim 7, wherein the first pulley is a single polymer casting.

12. The pipe replacement system of claim 7, wherein the first pulley, includes a metallic pulley with a polymer coating.

13. The pipe replacement system of claim 7, wherein the pulley includes a cable groove in a center of the pulley, within the bursting tool guide surface.

\* \* \* \* \*